United States Patent
Nakagiri et al.

(10) Patent No.: US 6,501,562 B1
(45) Date of Patent: Dec. 31, 2002

(54) PRINT CONTROL APPARATUS, PRINT CONTROL METHOD, AND STORAGE MEDIUM

(75) Inventors: Koji Nakagiri; Satoshi Nishikawa, both of Kawasaki; Yasuo Mori; Yasuhiro Kujirai, both of Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/123,366

(22) Filed: Jul. 28, 1998

(30) Foreign Application Priority Data

Jul. 30, 1997 (JP) .............................. 9-218317
Jul. 10, 1998 (JP) ........................... 10-195713

(51) Int. Cl.⁷ .............................................. G06K 1/00
(52) U.S. Cl. ...................... 358/1.2; 358/296; 358/401; 358/1.18
(58) Field of Search ................... 358/296, 401, 358/449, 450, 451, 452, 453, 1.2, 1.12, 1.18

(56) References Cited

U.S. PATENT DOCUMENTS

| | | | |
|---|---|---|---|
| 4,925,176 A | | 5/1990 | Acquaviva ................. 271/3.1 |
| 4,928,252 A | * | 5/1990 | Gabbe et al. ................ 358/1.2 |
| 5,442,432 A | | 8/1995 | Tani ............................. 355/324 |
| 5,731,879 A | * | 3/1998 | Maniwa et al. ............. 358/296 |
| 6,104,498 A | * | 8/2000 | Shima et al. .............. 358/1.14 |

FOREIGN PATENT DOCUMENTS

| | | | |
|---|---|---|---|
| EP | 0330343 | 8/1989 | .......... G06F/15/20 |
| EP | 048970 | 4/1992 | .......... H04N/1/387 |

* cited by examiner

Primary Examiner—Mark Wallerson
Assistant Examiner—Twyler Lamb
(74) Attorney, Agent, or Firm—Fitzpatrick, Cella, Harper & Scinto

(57) ABSTRACT

A print control apparatus, a print control method, and a storage medium in which even in case of performing a face-up paper delivery, an N-up output result can be obtained in accordance with a combination of pages and a page arranging order which are similar to those in the normal order printing are provided. A device to realize them without modifying a conventional portion is also provided.

40 Claims, 10 Drawing Sheets

OUTPUT IN NORMAL ORDER

PRESENT INVENTION

PRINT CONTROL APPARATUS, PRINT CONTROL METHOD, AND STORAGE MEDIUM

BACKGROUND OF THE INVENTION

1. Field of the Invention

The invention relates to a print control apparatus, a print control method, and a storage medium. More particularly, the invention relates to a print control apparatus, a print control method, and a storage medium which are suitable in case of performing a printing such that a plurality of pages are reduced and arranged in one page in a system comprising an information processing apparatus such as a personal computer or the like and an output apparatus such as a printer or the like.

2. Related Background Art

In recent years, in an output apparatus (hereinafter, also referred to as a printer) such as a printer or the like, there is an output apparatus having a function to perform a printing such that a plurality of pages based on print data transmitted from an information processing apparatus to which the output apparatus is connected are reduced and arranged into one page, namely, a function to perform what is called an N-up printing. The N-up printing function is a function prepared for the printer for the purpose of a draft printing, a saving of papers, or the like.

On the other hand, in the output apparatus, there is an output apparatus having a function to perform a face-down paper delivery which is a general operation in a laser beam printer or the like or an output apparatus having a function to perform a face-up paper delivery which is a general operation in an ink jet printer, a copying apparatus, or the like. In case of the face-down paper delivery, output papers are aligned in accordance with the page order based on the print data received from the information processing apparatus. However, in case of the face-up paper delivery, an output result in which the page based on the print data received lastly from the information processing apparatus is arranged at the top position is obtained.

Therefore, as a method of setting the page order to the normal order in case of the face-up paper delivery, when the print data is transmitted from the information processing apparatus, a method of transmitting in accordance with the reverse page order is used. Although a method of outputting the print data in accordance with the reverse page order on the output apparatus side is also considered, in this case, a memory or a disk to temporarily spool the print data of all of the pages included in a job into the output apparatus is necessary or it is necessary to prepare an apparatus to rearrange the printed papers in accordance with the reverse order in the output apparatus. However, since a large amount of costs are required for this purpose, it is actually a general way to use the method of transmitting the print data in accordance with the reverse order from the information processing apparatus.

However, the above conventional technique has the following problems. That is, as mentioned above, hitherto, the reverse order printing has been performed from an application to the printer having the function to perform the face-up paper delivery. However, if the N-up printing function of the printer is further used, in the printer, N pages from the head page based on the print data received from the application are reduced and arranged into one page. Therefore, there is a problem such that a combination of the pages which are reduced and arranged in each page differs from that in case of the normal order. There is also a problem such that the arranging order of the pages which are reduced and arranged in each page differs from that in case of the normal order.

SUMMARY OF THE INVENTION

The invention is made in consideration of the above problems and it is an object to provide a device such that even in case of performing a face-up paper delivery in a page printer, namely, even in case of performing a reverse order printing, an N-up output result can be obtained in accordance with a combination of pages similar to that in the normal order printing and in accordance with a page arranging order similar to that in the normal order printing.

Another object of the invention is to provide a device such that when an instruction to designate both of a reverse order printing and an N-up printing is received from the user, an information processing apparatus such as a host or the like forms print data to be N-up outputted in accordance with a page arranging order similar to the normal order printing and can output the modified print data to a printing apparatus.

Still another object of the invention is to provide a device such that the reverse order printing and the N-up printing can be designated without newly producing a portion to form a PDL (Page Description Language) from a print information (for example, DDI: Device Driver Interface) function generated from a printer driver portion corresponding to a printer which does not have the conventional N-up printing function, namely, from a graphic engine (for instance, GDI: Graphical Device Interface), and an output result can be obtained in accordance with a page arranging order similar to that of the normal order printing.

To accomplish the above objects, according to the invention, there is provided a print control apparatus having a reduction arrangement printing function for reducing, arranging, and printing a plurality of pages into one page, comprising: specifying means for specifying a logical page which is arranged onto a physical page in case of performing the reduction arrangement printing and the reverse order printing; inserting means for inserting blank logical pages into the remaining portions in the case where the number of logical pages does not reach the upper limit in which they can be arranged onto the physical page; and print control means for controlling so as to arrange a plurality of logical pages including the blank logical pages onto the physical page and to print.

According to the invention, the apparatus further comprises forming means for forming drawing data of one page by reducing drawing data of the plurality of logical pages including the blank logical pages, and the print control means controls so as to arrange the drawing data of one page onto one physical page and to print.

According to the invention, the logical page is an ordinary page which is handled in the application, and the physical page is a page which includes a plurality of reduced pages and is actually printed and outputted.

According to the invention, the reverse order printing denotes that the logical pages are arranged onto the physical page in accordance with the order from the small page number and the physical pages are reversely arranged from the last page and are printed.

The invention can be applied to a system such that print data is transmitted from an upper apparatus such as a computer or the like to a printing apparatus such as a printer or the like and is printed.

The invention further comprises: preserving means for temporarily preserving the data in an intermediate code format different from that of the print data; and forming means for forming the print data on the basis of the data temporarily stored.

According to the invention, there is provided a print control apparatus for outputting print data including at least one physical page in which a plurality of logical pages are reduced and arranged, comprising: dispatcher means for receiving common print information which is formed on the basis of drawing data formed by an arbitrary application from drawing means depending on an OS; intermediate data converting means for converting the print information received by the dispatcher means into intermediate data and storing the intermediate data into spool means; designating means for designating a reverse order printing and the reduction arrangement of the logical pages; specifying means for specifying the logical pages which are arranged onto the physical page in the case where the reverse order printing and the reduction arrangement are designated by the designating means; inserting means for inserting blank logical pages into the remaining portions in the case where the number of logical pages does not reach an upper limit in which they can be arranged on the physical page; modifying means for forming intermediate data in which a plurality of logical pages including the blank logical pages are arranged on the physical page from the intermediate data stored in the spool means and generating the formed intermediate data to the drawing means in the drawing data format; and print data forming means for converting the print information received by the dispatcher means into print data constructed by a control command and outputting the print data to an external apparatus.

According to the invention, the drawing data is a GDI (Graphical Device Interface).

According to the invention, the print information is a DDI (Device Driver Interface).

According to the invention, the print data is a page description language.

BRIEF DESCRIPTION OF THE DRAWINGS

FIGS. 4A, 4B and 4C are explanatory diagrams showing examples of output results of an N-up reverse order printing according to the first embodiment of the invention, in which FIG. 4A is an explanatory diagram showing the output result of the normal order, FIG. 4B is the explanatory diagram showing the conventional output result, and FIG. 4C is the explanatory diagram showing an output result according to the first embodiment of the invention;

DETAILED DESCRIPTION OF THE PREFERRED EMBODIMENTS

Figure 1:
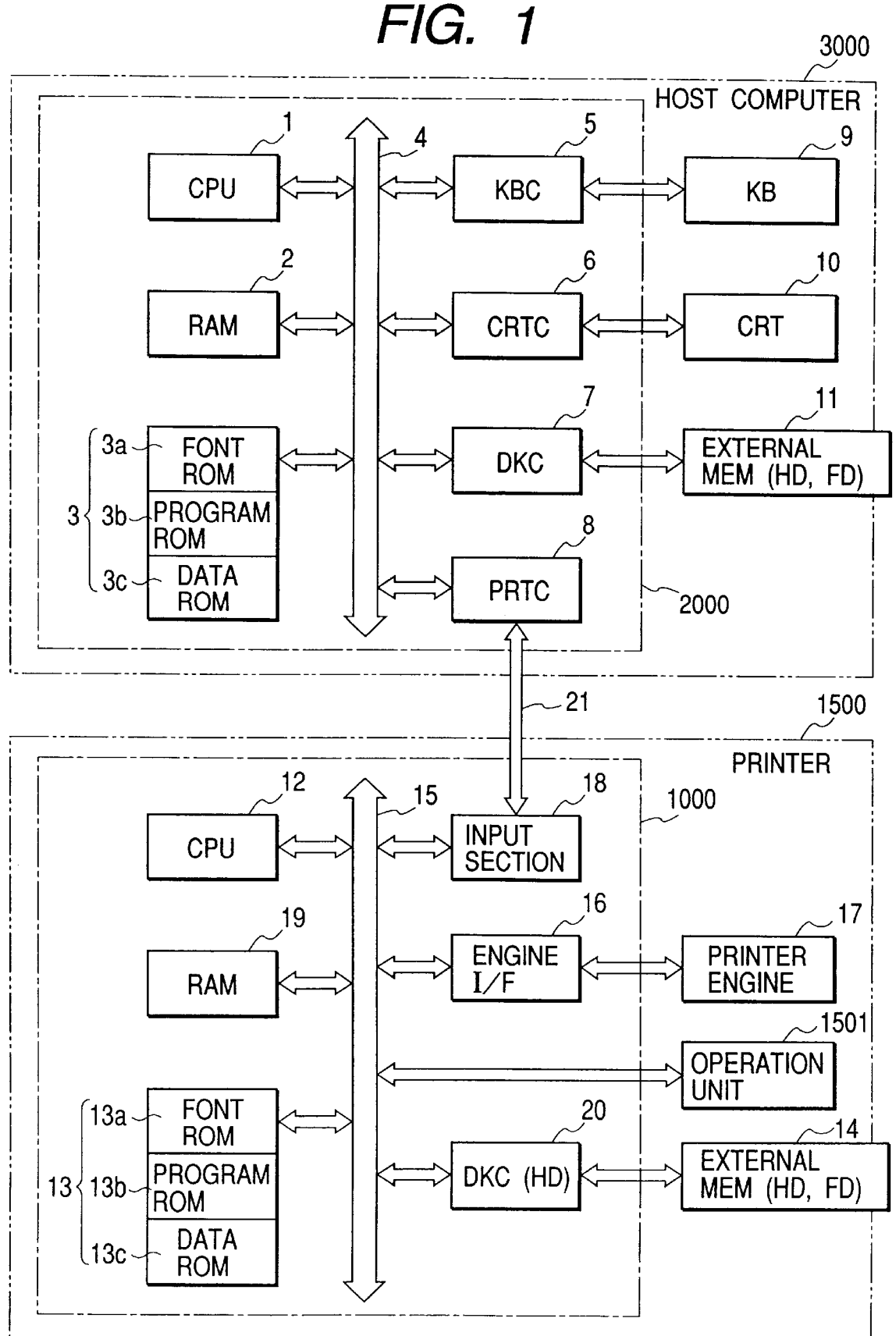
FIG. 1 is a block diagram showing a whole construction of a printer control system according to the first to third embodiments of the invention.

Embodiments of the invention will now be described hereinbelow with reference to the drawings.

1 First Embodiment

A construction of a printer control system according to the first embodiment will be first described with reference to a block diagram of FIG. 1. It will be obviously understood that the invention can be applied to any one of single equipment, a system comprising a plurality of equipment, and a system which is connected through a network such as LAN (Local Area Network), WAN (Wide Area Network), or the like and in which processes are executed so long as the function of the invention is executed.

As a form of an actual product to which the invention can be applied, an FD (Floppy Disk), a CD-ROM (Compact Disc ROM), a BBS (Bulletin Board System: a message exchange system using a computer) such as Internet Web Site, Nifty Serve, or the like can be mentioned. That is, the program of the invention can be supplied from the FD or CD-ROM to the printer control system and the printer control system can be connected to the internet or Nifty Serve.

<Construction of Print System>

The printer control system according to the first embodiment is constructed by a host computer 3000 and a printer 1500. The host computer 3000 comprises: a CPU 1; an RAM 2; an ROM 3; a keyboard controller (KBC) 5; a CRT controller (CRTC) 6; a disk controller (DKC) 7; a printer controller (PRTC) 8; a keyboard (KB) 9; a CRT display (CRT) 10; and an external memory 11. The printer 1500 comprises: a CPU 12; an RAM 19; an ROM 13; an input section 18; an engine interface (I/F) 16; a disk controller (DKC) 20; a printer engine 17; an operation unit 1501; and an external memory 14.

A construction of each section of the host computer 3000 will be first described in detail. The CPU 1 is a central processing unit for integratedly controlling each device connected to the system bus 4 and executes a process of a document in which figures, images, characters, tables (including a spreadsheet or the like), and the like mixedly exist on the basis of a document processing program or the like stored in the program ROM 3b (which will be explained hereinlater) of the ROM 3 or the external memory 11. The CPU 1 executes, for example, a developing (rasterizing) process of an outline font into a display information RAM set on the RAM 2, thereby enabling WYSIWYG (What You See Is What You Get: a function such that print data can be printed in the same size and shape seen on the screen of a CRT display) on the CRT display 10.

Further, the CPU 1 opens various registered windows on the basis of a command instructed by a mouse cursor (not shown) or the like on the CRT display 10 and executes various data processes. When the printing is executed by using the printer 1500, the user opens the window regarding the setting of the printing and can set a print processing method including the setting of the printer 1500 and the selection of a printing mode for a printer driver.

The RAM 2 functions as a main memory, a working area, or the like of the CPU 1. The ROM 3 has an ROM 3*a* for a font, an ROM 3*b* for a program, and an ROM 3*c* for data. The font ROM 3*a* or external memory 11 stores font data or the like which is used at the time of the document process. The program ROM 3*b* or external memory 11 stores an operating system (hereinafter, abbreviated to "OS") as a control program of the CPU 1. The data ROM 3*c* or external memory 11 stores various data which is used when the document process or the like is executed.

The keyboard controller (KBC) 5 controls a key input from the keyboard 9 or a pointing device (not shown). The CRT controller (CRTC) 6 controls the display of the CRT display 10. The disk controller (DKC) 7 controls the access to the external memory 11. The printer controller (PRTC) 8 is connected to the printer 1500 through a bidirectional interface 21 and executes a communication control process with the printer 1500. The keyboard 9 has various keys.

The CRT display (CRT) 10 displays figures, images, 11 is made up of a hard disk (HD), a floppy disk (FD), or the like and stores a boot program, various applications, font data, a user file, an edition file, a printer control command forming program (hereinafter, referred to as a printer driver), and the like.

The foregoing CPU 1, RAM 2, ROM 3, keyboard controller (KBC) 5, CRT controller (CRTC) 6, disk controller (DKC) 7, and printer controller (PRTC) 8 are arranged on a computer control unit 2000.

A construction of each section of the printer 1500 will now be described. The CPU 12 is the central processing unit for integratedly controlling each device connected to a system bus 15. On the basis of a control program or the like stored in the program ROM 13*b* (which will be explained hereinlater) of the ROM 13 or a control program or the like stored in the external memory 14, the CPU 12 outputs an image signal as output information to the (printing unit) printer engine 17. The CPU 12 can perform a communicating process to the host computer 3000 through the input section 18 and can notify the host computer 3000 of information or the like in the printer 1500.

The RAM 19 functions as a main memory, a working area, or the like of the CPU 12 and can expand a memory capacity by an option RAM (not shown) which is connected to an expansion port. The RAM 19 is used for an output information developing area, an environment data storing area, an NVRAM, or the like. The ROM 13 has a font ROM 13*a*, a program ROM 13*b*, and a data ROM 13*c*. The font ROM 13*a* stores font data or the like which is used to form the output information. The program ROM 13*b* stores the control program or the like of the CPU 12. When the external memory 14 such as a hard disk or the like is not connected to the printer 1500, the data ROM 13*c* stores information or the like which is used on the host computer 3000.

The input section 18 performs transmission and reception of data between the printer 1500 and host computer 3000 through the bidirectional interface 21. The engine interface (I/F) 16 executes transmission and reception of data between the CPU 12 and printer engine 17. The disk controller (DKC) 20 controls the access to the external memory 14. The printer engine 17 performs a printing operation on the basis of the control of the CPU 12. The operation unit 1501 has switches, display means (for example, LED display device), and the like for various operations.

The external memory 14 is made up of a hard disk (HD), an IC card, or the like and is connected as an option to the printer 1500. The external memory 14 stores font data, an emulation program, form data, or the like and its access is controlled by the disk controller (DKC) 20. The number of external memories 14 is not limited to 1 but a plurality of external memories can be also provided. That is, it is also possible to construct in a manner such that besides the built-in fonts, a plurality of option cards or external memories in which a program to interpret printer control languages of different language systems has been stored can be connected to the printer 1500. Further, it is also possible to have an NVRAM (not shown) and to store printer mode setting information from the operation unit 1501.

The foregoing CPU 12, RAM 19, ROM 13, input section 18, engine interface (I/F) 16, and disk controller (DKC) 20 are arranged on a printer control unit 1000.

Figure 2:
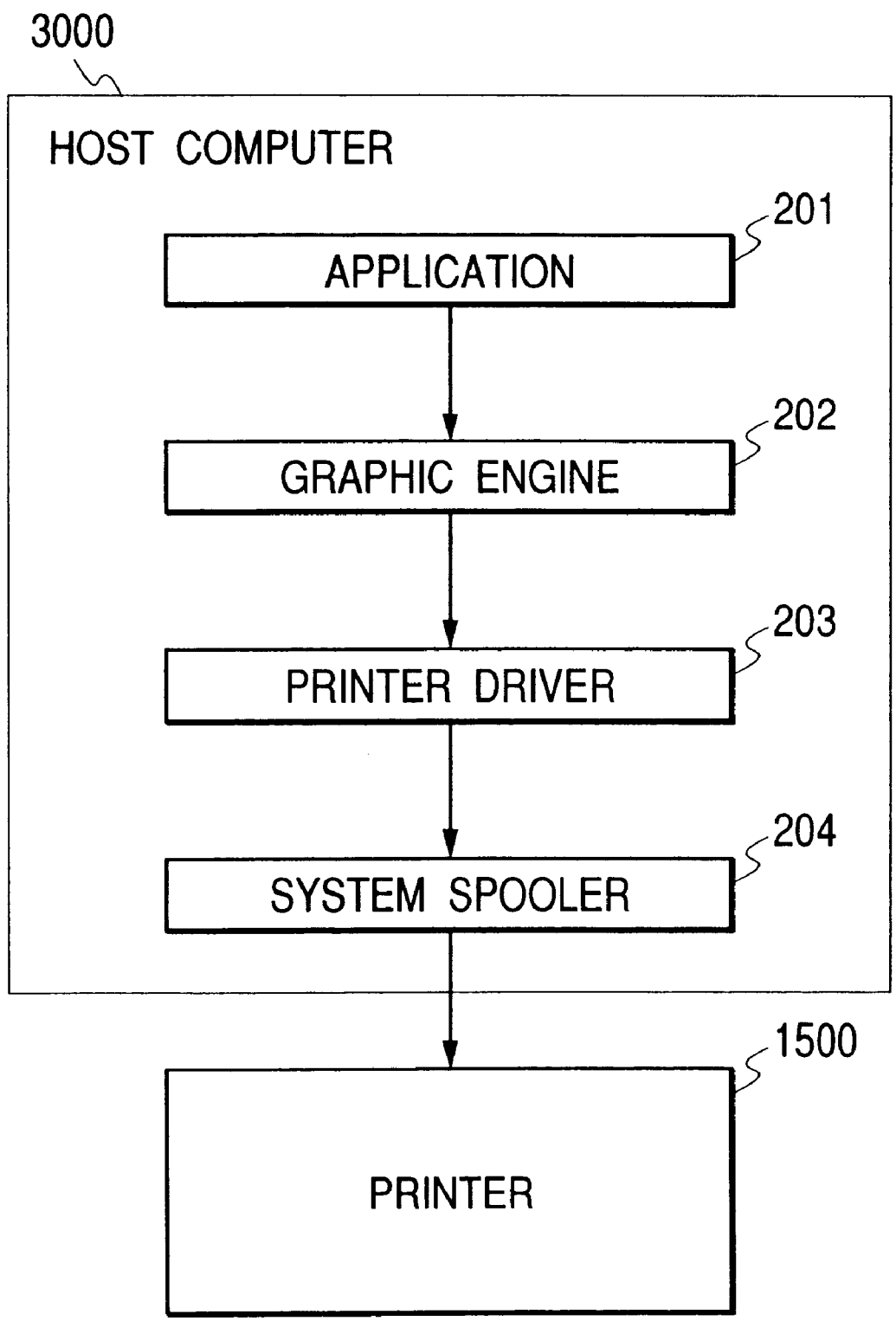
FIG. 2 is a block diagram showing a construction of a typical printing process in a host computer according to the first to third embodiments of the invention.

FIG. 2 is a block diagram showing a construction of a typical printing process in the host computer 3000 to which the printing apparatus such as a printer or the like is directly connected or is connected via the network. In FIG. 2, an application 201, a graphic engine 202, a printer driver 203, and a system spooler 204 are program modules which exist as files preserved in the external memory 11 in FIG. 1 and are loaded into the RAM 2 and executed by the OS or a module using those modules when they are executed.

The application 201 and printer driver 203 can be added into the FD or CD-ROM of the external memory 11 or onto the HD of the external memory 11 via the network (they are not shown). The application 201 preserved in the external memory 11 is loaded into the RAM 2 and is executed. However, when the printing is performed from the application 201 to the printer 1500, an output (drawing) is executed by using the graphic engine 202 which has similarly been loaded into the RAM 2 and can be executed.

The graphic engine 202 similarly loads the printer driver 203 prepared every printing apparatus from the external memory 11 into the RAM 2 and sets an output of the application 201 into the printer driver 203. The GDI (Graphic Device Interface) function which is received from the application 201 is converted into the DDI (Device Driver Interface) function and the DDI function is outputted to the printer driver 203. On the basis of the DDI function received from the graphic engine 202, the printer driver 203 converts it into a control command, for example, a PDL (Page Description Language) which can be recognized by the printer. The converted printer control command is outputted as print data to the printer 1500 via the interface 21 through the system spooler 204 loaded into the RAM 2 by the OS.

<Construction of Print Control System>

Figure 3:
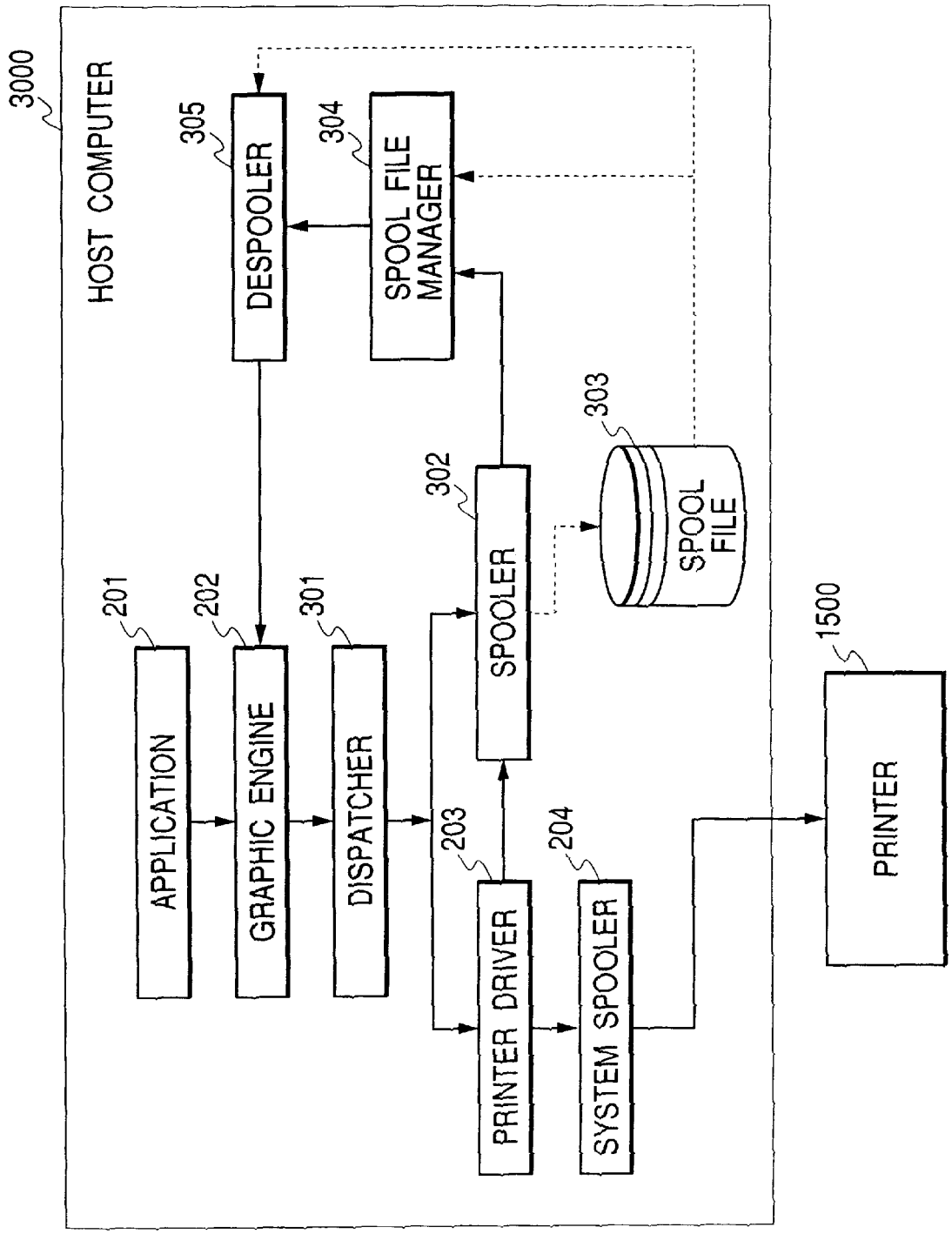
FIG. 3 is a block diagram for explaining a print data forming method according to the first to third embodiments of the invention.

In addition to the print system comprising the printer 1500 and host computer 3000 shown in FIGS. 1 and 2, the printer control system according to the first embodiment further has a construction such that the print data from the application is temporarily spooled by intermediate code data as shown in FIG. 3.

FIG. 3 showing the invention relates to a system obtained by expanding the system of FIG. 2 and illustrates a construction such that when a print command is sent from the graphic engine 202 to the printer driver 203, a spool file 303 comprising an intermediate code is temporarily formed. In the system of FIG. 2, the application 201 is released from the printing process at a timing when the printer driver 203 finishes the conversion from all of the print commands from the graphic engine 202 into the control commands of the printer 1500.

On the other hand, in the system of FIG. 3, the application 201 is released from the printing process at a time point when a spooler 302 converts all of the print commands into intermediate code data and outputs to the spool file 303. Usually, in the latter case, since the time to convert into the control commands of the printer 1500 is unnecessary, the process is finished in a short time. In the system shown in FIG. 3, the contents of the spool file 303 can be modified. Thus, for the print data from the application, the function which the application does not have such as magnification/reduction, N-up printing in which a plurality of pages are reduced and printed in one page, or the like can be realized.

For the above objects, the system is expanded so as to spool by the intermediate code data as shown in FIG. 3 for the system of FIG. 2. To modify the print data, usually, the setting is performed from a window that is provided by the printer driver 203 and the printer driver 203 preserves the set contents into the RAM 2 or external memory 11.

FIG. 3 will now be described in detail hereinbelow. As shown in the diagram, according to the expanded processing system, a dispatcher 301 receives the print command from the graphic engine 202 based on the data formed by the application 201. In the case where the print command received by the dispatcher 301 from the graphic engine 202 is a print command issued from the application 201 to the graphic engine 202, the dispatcher 301 loads the spooler 302 stored in the external memory 11 into the RAM 2 and sends the print command to the spooler 302 instead of the printer driver 203.

The spooler 302 converts the received print command into an intermediate code and outputs to the spool file 303. The spooler 302 obtains the modification setting contents set by the user with respect to the print data for the printer driver 203 from the RAM 2 through the printer driver 203 and preserves the modification setting contents into the spool file 303. Although the spool file 303 is formed as a file on the external memory 11, it can be also formed on the RAM 2. Further, the spooler 302 loads a spool file manager 304 stored in the external memory 11 into the RAM 2 and notifies the spool file manager 304 of a forming situation of the spool file 303.

After that, the spool file manager 304 discriminates whether the printer driver 203 can form print data in accordance with the modification setting contents regarding the print data preserved in the spool file 303 or not. The spool file 303 manages the intermediate data on a unit basis of a logical page as a page outputted from the application. As mentioned above, the spool file 203 manages the modification setting contents set by the user for the printer driver 203, for example, the setting contents of the 4-up (data of four pages is reduced and printed onto a paper of one page) printing. Therefore, as for the discrimination about whether the printer driver 203 can form the print data or not, if all of the necessary logical pages are managed in the spool file 303 on the basis of the modification setting contents stored in the spool file 303, all of the data necessary to form the print data has been prepared, so that it is possible to determine that the print data can be formed. When the spool file manager 304 decides that the print data can be formed by the printer driver by using the graphic engine 202, the spool file manager 304 loads a despooler 305 stored in the external memory 11 into the RAM 2 and instructs the despooler 305 to perform a printing process of the intermediate data described in the spool file 303. In this instance, the spool file manager 304 also instructs influence information on the logical pages in association with the modification setting to the despooler 305. For example, when the 4-up printing has been set, the spool file manager 304 calculates position information showing at which position in the physical page each logical page is printed and size information showing a size of logical page in the physical page and instructs the influence information including the position information and size information to the despooler every logical page. A method of obtaining the position information will be explained hereinlater with reference to FIGS. 5 and 6.

The despooler 305 modifies the intermediate code included in the spool file 303 in accordance with the contents of the influence information which is instructed by the spool file manager 304, converts the modified intermediate data into the GDI function, and outputs it to the graphic engine 202. The despooler 305 executes the following modification. On the basis of the logical page derived from the spool file 303 and the influence information obtained from the spool file manager 304, the despooler 305 again calculates a position and a size in the physical page of the character data that is drawn in the logical page. Specifically speaking, for example, in case of 4-up, the data size is simply multiplied by ¼. With respect to the data position, the despooler 305 recognizes the logical page position which is allocated from the position information of the logical page on the physical page and obtains the data position in the logical page in consideration of the distance of ¼ time. The despooler 305 converts the intermediate data obtained by modifying as mentioned above into the GDI function and outputs it to the graphic engine 202. The graphic engine 202 forms the DDI function from the GDI function received from the despooler 305 and outputs a print command comprising the DDI function to the dispatcher 301. In the case where the print command of the DDI function received by the dispatcher from the graphic engine 202 is the print command of the GDI function issued from the despooler 305 to the graphic engine 202, the dispatcher 301 sends the print command to the printer driver 203 instead of the spooler 302. The printer driver 203 forms print data comprising the printer control command on the basis of the received print command and outputs it to the printer 1500 via the system spooler 204.

<Construction of Printer>

Figure 11:
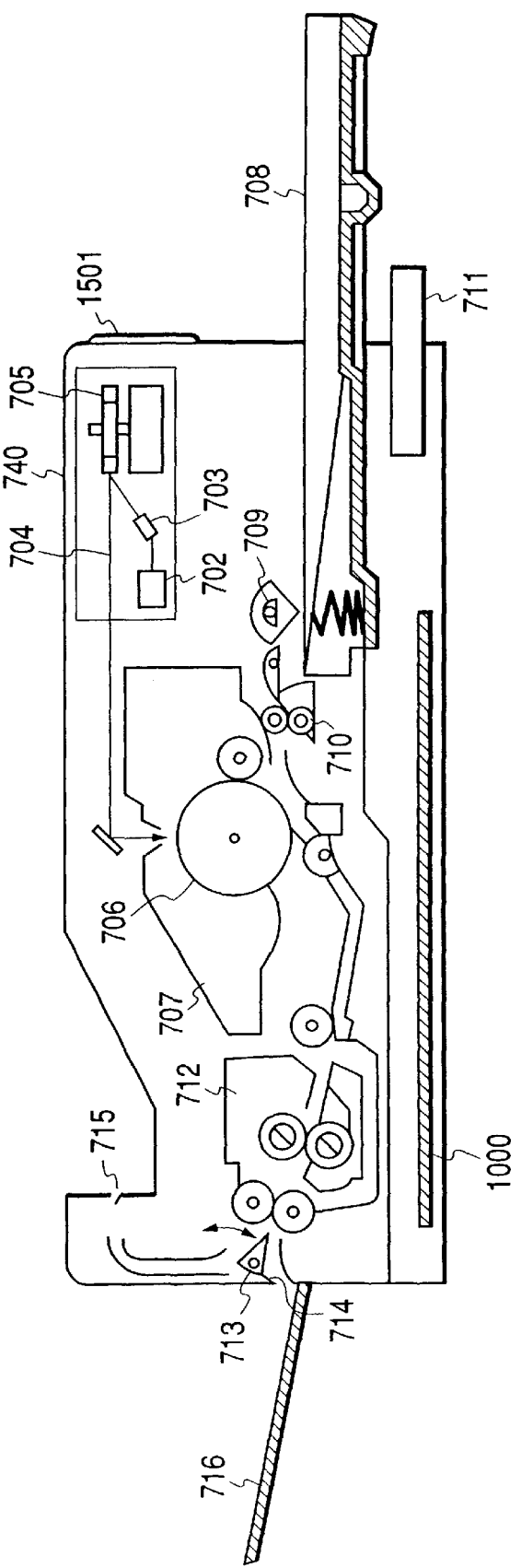
FIG. 11 is a cross sectional view showing an internal construction of a printer according to the first to third embodiments of the invention.

FIG. 11 is a cross sectional view showing an internal structure in case of a laser beam printer (hereinafter, abbreviated to "LBP") as an example of the printer 1500 according to the first embodiment. The printer 1500 as an LBP can input character pattern data or the like and can print onto a recording paper. According to the printer 1500, an LBP main body 740 for forming an image onto the recording paper as a recording medium on the basis of a printer control command or the like which is supplied comprises: the printer control unit 1000; the operation unit 1501; a laser driver 702; a semiconductor laser 703; a rotary polygon mirror 705; an electrostatic drum 706; a developing unit 707; a paper cassette 708; a feed roller 709; a conveying roller 710; an external memory 711; a fixing unit 712; a change-over wedge 713; a face-up ejecting unit 714; a face-down ejecting unit 715; and a paper delivery tray 716.

A construction of each of the above sections will now be described in detail together with the operation. The printer control unit 1000 performs a whole control of the LBP main body 740 and analyzes character pattern information or the like. The printer control unit 1000 mainly converts a printer control command into a video signal and outputs to the laser driver 702. The external memory 711 to store font data, a n emulation program in a page description language, or the like can be also connected to the printer control unit 1000. A switch, display means (for example, LED display), and the like for operation as mentioned above are arranged in the operation unit 1501.

The laser driver 702 is a circuit to drive the semiconductor laser 703 and on/off switches a laser beam 704 which is emitted from the semiconductor laser 703 in accordance with an inputted video signal. The semiconductor laser 703 emits the laser beam toward the rotary polygon mirror 705. The rotary polygon mirror 705 swings the laser beam 704 to the right and left, thereby scanning on the electrostatic drum 706. An electrostatic latent image of a character pattern is formed on the surface of the electrostatic drum 706 by the scan of the laser beam 704.

The developing unit 707 is arranged around the electrostatic drum 706 and develops the electrostatic latent image. After completion of the development, the image is transferred onto the recording paper. The paper cassette 708 encloses, for example, cut sheet recording papers as recording papers. The feed roller 709 and conveying roller 710 fetch the cut sheet recording paper in the paper cassette 708 into the LBP main body 740 and feeds to the electrostatic drum 706. In this case, the cut sheet recording paper can be also supplied from a manual insertion feed tray (not shown) provided on the upper surface of a cover portion of the paper cassette 708.

The fixing unit 712 heats the toner image transferred onto the cut sheet recording paper, thereby fixing the image onto the cut sheet recording paper. In the case where the change-over wedge 713 is set upward, the cut sheet recording paper on which the image was formed is ejected onto the paper delivery tray 716 from the face-up ejecting unit 714 in a state where the recording surface faces upward. On the other hand, when the change-over wedge 713 is set downward, the recording paper is ejected from the face-down ejecting unit 715 in a state where the recording surface faces downward.

<Method for N-up Reverse Order Printing>

In the printing mode to reduce and arrange a plurality of pages into one page, namely, in the N-up printing, both of the ordinary page which is handled by the application and a page which is actually outputted and includes the plurality of reduced pages exist. To distinguish them, the former is called a logical page and the latter is called a physical page.

Figure 4A:
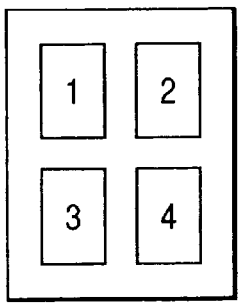
Figure 4A:
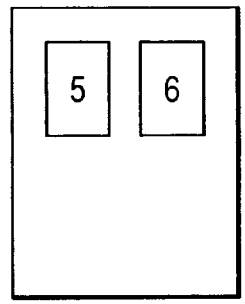
Figure 4B:
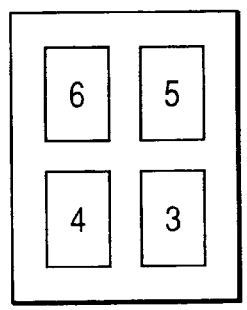
Figure 4B:
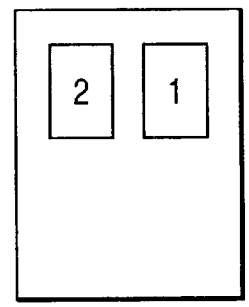
Figure 4C:
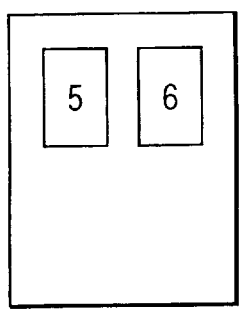
Figure 4C:
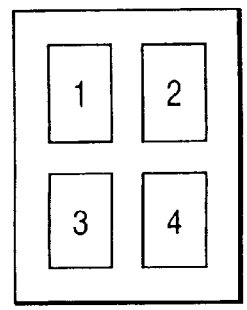

FIGS. 4A to 4C are diagrams showing examples of output results of the N-up reverse order printing. FIG. 4A shows the output result of the normal order. FIG. 4B shows the conventional output result. FIG. 4C shows the output result according to the first embodiment of the invention. In FIGS. 4A to 4C, when an image of, for example, six pages is printed from the application, the output results in case of using the 4-up printing function of the printer to output the images of four pages into one page are shown. In the normal order printing, the data of each logical page which was received by the printer and sent from the application is arranged into one physical page every four pages from the head. As for the arranging order, the order in case of arranging from the upper left to the right and from the top to the bottom is shown in the diagrams.

The conventional output result shown in FIG. 4B illustrates the case where the pages are outputted by a combination of the reverse order printing of the application and the N-up printing function of the printer. In this case, in a manner similar to the case of the normal order, the printer sequentially arranges the data of the received logical pages onto the physical page every four pages from the head, so that the combination of the logical papers which are arranged on each physical page differs from that in case of the normal order. Further, the arranging order is also opposite to that in case of the normal order.

On the other hand, in the output result according to the first embodiment of the invention shown in FIG. 4C, when the number of logical pages cannot be perfectly divided by N (4 in case of the example of FIGS. 4A to 4C) of N-up, by inserting the blank logical pages onto the first physical page, the combination of the logical pages which are arranged onto the physical page is matched to that in case of the normal order. As for the arranging order as well, by sequentially arranging the logical pages to be arranged onto each physical page in accordance with the order from the small page number, an arranging order similar to that in case of the normal order can be derived. Thus, even in case of an output apparatus for outputting in the face-up paper delivery state, an output result similar to the output result which is obtained at the time of the normal order can be derived.

<Print Control Procedure>

Figure 5:
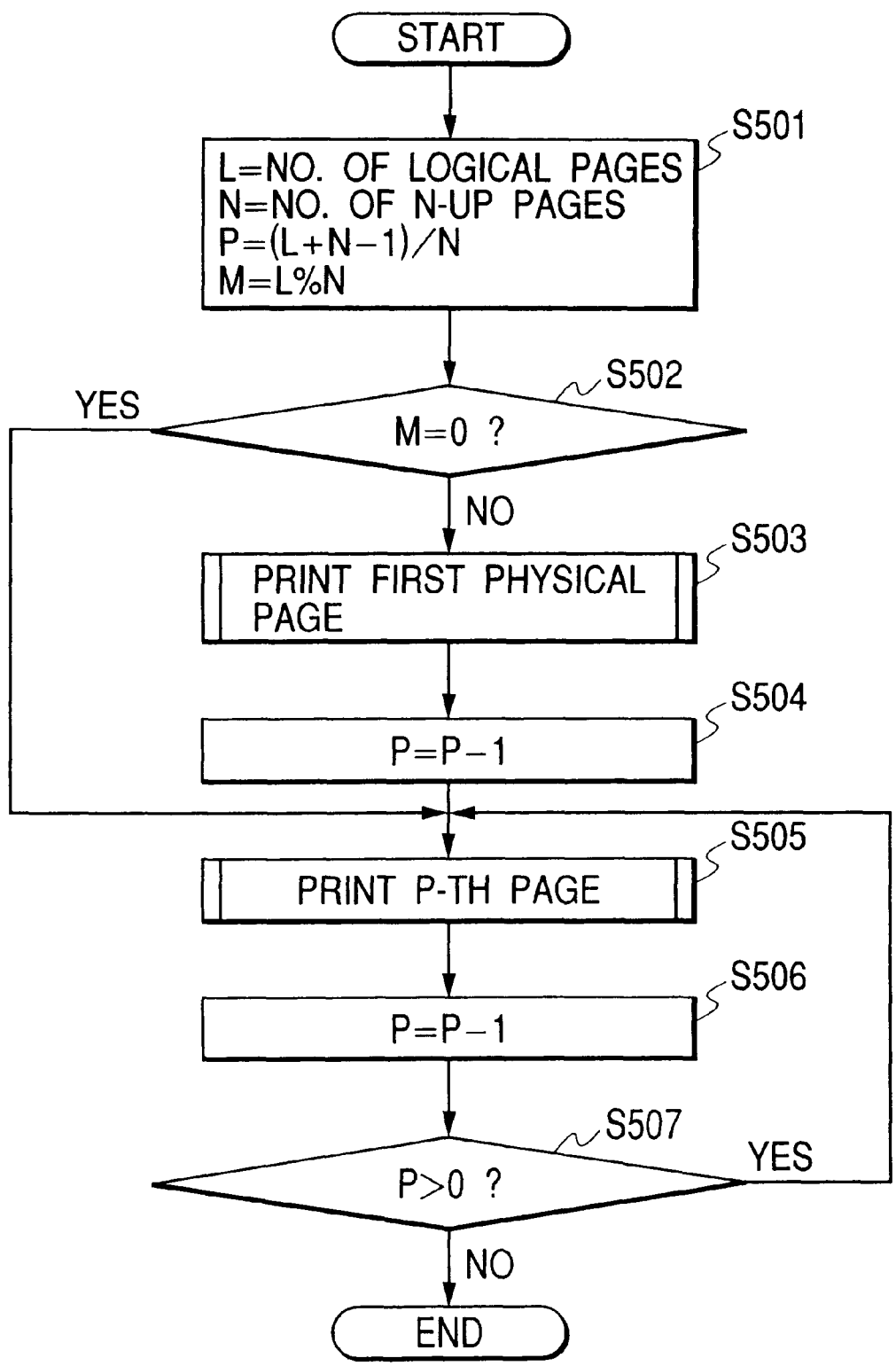
FIG. 5 is a flowchart showing a print processing procedure of the N-up reverse order printing according to the first embodiment of the invention.
Figure 6:
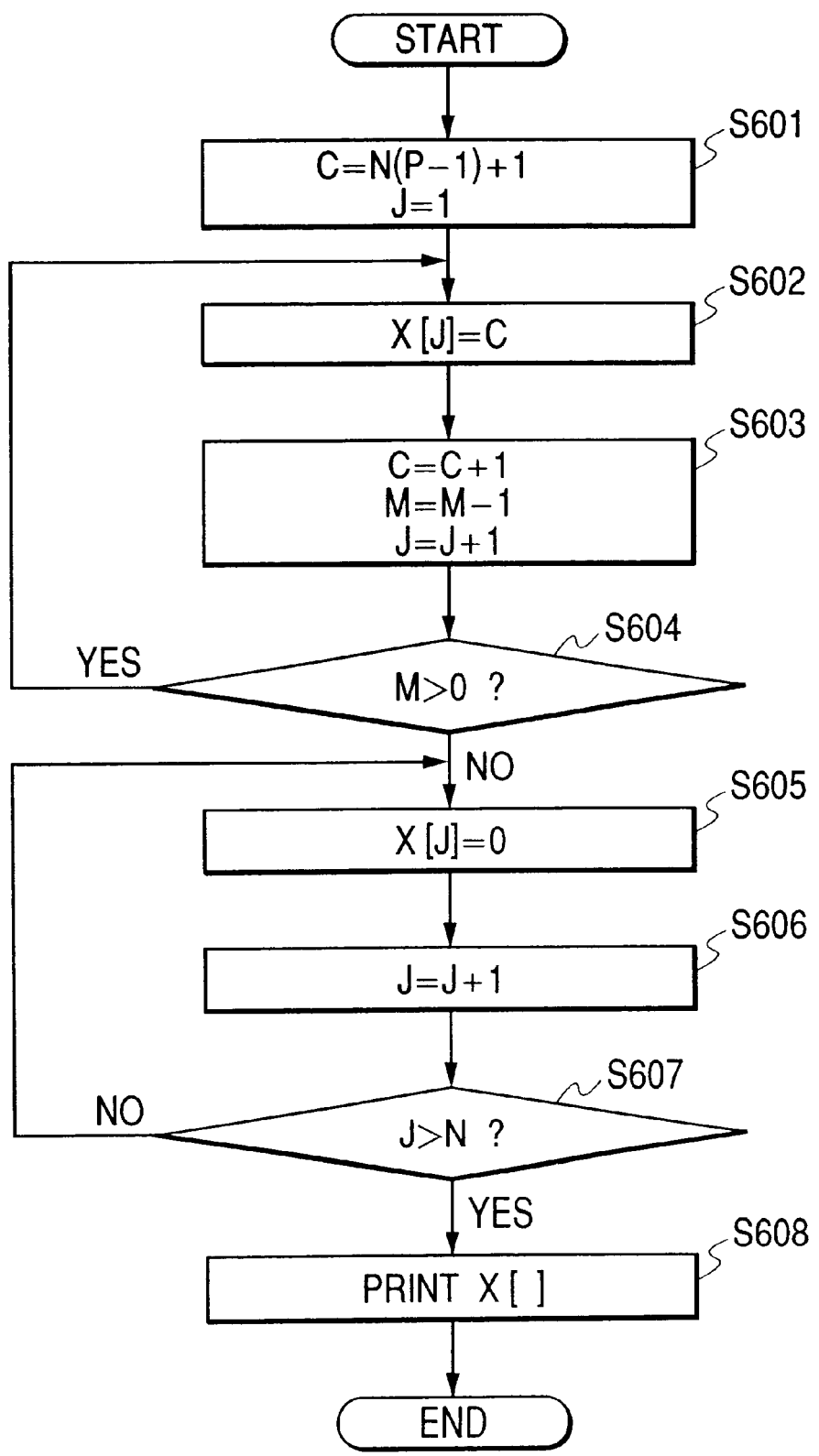
FIG. 6 is a flowchart showing a print processing procedure of a physical page including blank logical pages according to the first embodiment of the invention.
Figure 8:
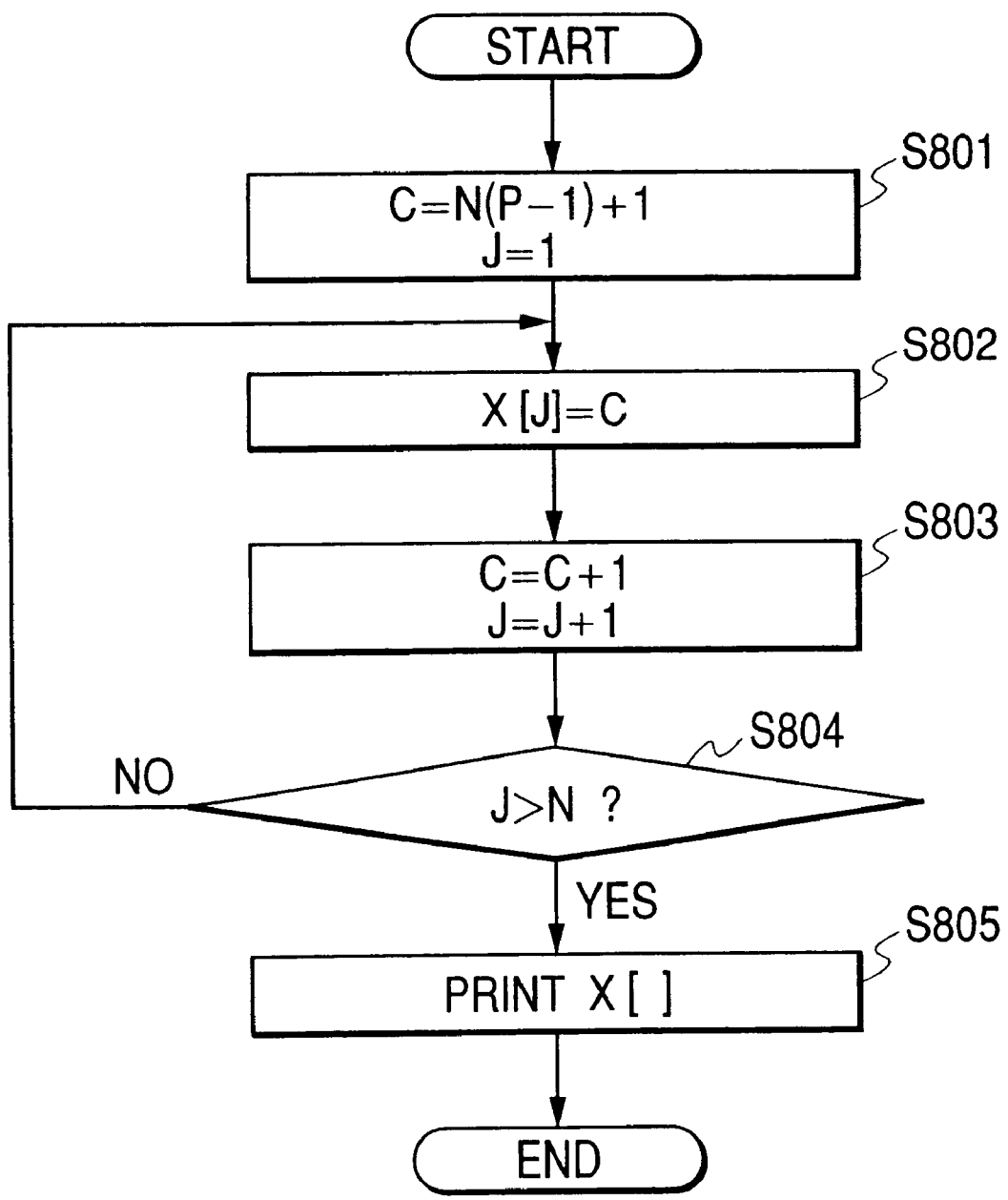
FIG. 8 is a flowchart showing a print processing procedure of a physical page including no blank logical page according to the first embodiment of the invention.

A printing process in the both-sides printing mode in the printer control system according to the first embodiment constructed as mentioned above will now be described in detail mainly with reference to flowcharts of FIGS. 5, 6, and 8. FIG. 5 shows a control procedure which is executed by the spool file manager 304 mentioned above. FIG. 6 shows a print processing procedure of the physical page including the blank logical pages. FIG. 8 shows a print processing procedure of the physical page including no blank logical page. In the reverse order printing mode, it is assumed that the despooler 305 reduces the data of each logical page and executes the N-up printing mode and the N-up function of the printer is not used.

When the printing is started from the application 201, the spooler 302 obtains the setting of the printing from the printer driver 203 and stores into the spool file 303. When the spool file manager 304 is not activated, the spooler 302 loads the spool file manager into the RAM 2 and notifies the spool file manager 304 of a fact that the printing has been started. After completion of the activation, the spool file manager 304 loads the despooler onto the RAM 2 until a time point when it is necessary to instruct the despooler 305 to print.

The spool file manager 304 reads the setting contents of the printing recorded in the spool file 303. When it is determined that the printing mode is the printing using the N-up printing and the reverse order printing, the spool file manager 304 waits for a notification of the completion of the spool of all of the pages from the spooler 302. The present processing routine is started at a time point when the spool completion notification is received.

In FIG. 5, in step S501, the spool file manager 304 sets the total number of logical pages in which the printing has been executed from the application into L and sets the number of logical pages (for example, 4 in case of the 4-up printing) which are arranged into each physical page to N. On the basis of L and N obtained here, the number P of physical pages which are necessary to print is obtained by the following calculation.

$$P = (L+N-1)/N$$

In this case, it is assumed that the remainder is omitted (P: natural number). The number M of logical pages included in the physical page which is printed for the first time (final physical page in the printing mode other than the reverse order printing) is obtained by the following calculation.

$$M = L \% N$$

In step S502, the spool file manager 304 discriminates whether the number M of logical pages is equal to 0 or not. When M=0, N logical pages are printed into all of the physical pages. In this case, step S505 follows. When M is not equal to 0, on the other hand, M (M<N) logical pages are printed into the physical page which is first printed and N logical pages are printed into all of the subsequent physical pages. In this case, step S503 follows.

In step S503, the spool file manager 304 prints one physical page including M (M<N) logical pages. The physical page includes (N−M) blank logical pages. Detailed processes in step S503 are shown in FIG. 6.

In FIG. 6, in step S601, by the following calculation, the spool file manager 304 calculates a value of C indicative of the number (which number of the page printed from the application) of the first logical page that is arranged on the physical page which is first printed. N and P are the same as those in FIG. 5.

$$C=N(P-1)+1$$

"1" is also set into J indicative of which number of the logical page to be arranged on the physical page.

In step S602, the spool file manager 304 sets the value of C into the J-th element in the array X[ ] comprising the page numbers of N logical pages. The array X[ ] is an array to transfer the numbers of N logical pages to be arranged on the physical page when the spool file manager 304 instructs the despooler 305 to perform the N-up printing. In step S603, the spool file manager 304 adds "1" to C in order to obtain the number of the logical page to be arranged next and subtracts "1" from M in order to obtain the number of remaining logical pages which are arranged in the first physical page. "1" is also added to J in order to designate the next value of the array.

In step S604, the spool file manager 304 examines the number M of remaining logical pages. When M is not larger than 0, it is determined that the logical pages to be arranged in the first physical page have been finished. Step S605 follows. When M is larger than 0, the processing routine is returned to step S602. The numbers of the logical pages to be arranged on the first physical page are sequentially set into the array X[ ]. After completion of the setting of the necessary logical page numbers into the array X[ ]), step S605 follows. The spool file manager 304 sets 0 to all of the residual portions of the array in which the logical page numbers are not set (steps S605, S606, S607).

In step S607, when the value of J is larger than N, namely, when it is decided that all of the N logical page numbers in the array X[ ] have been set, step S608 follows. The spool file manager 304 instructs the despooler 305 to perform the N-up printing which is expressed by the array X[ ]. The process in step S503 comprising steps S601 to S608 is finished.

Figure 7:
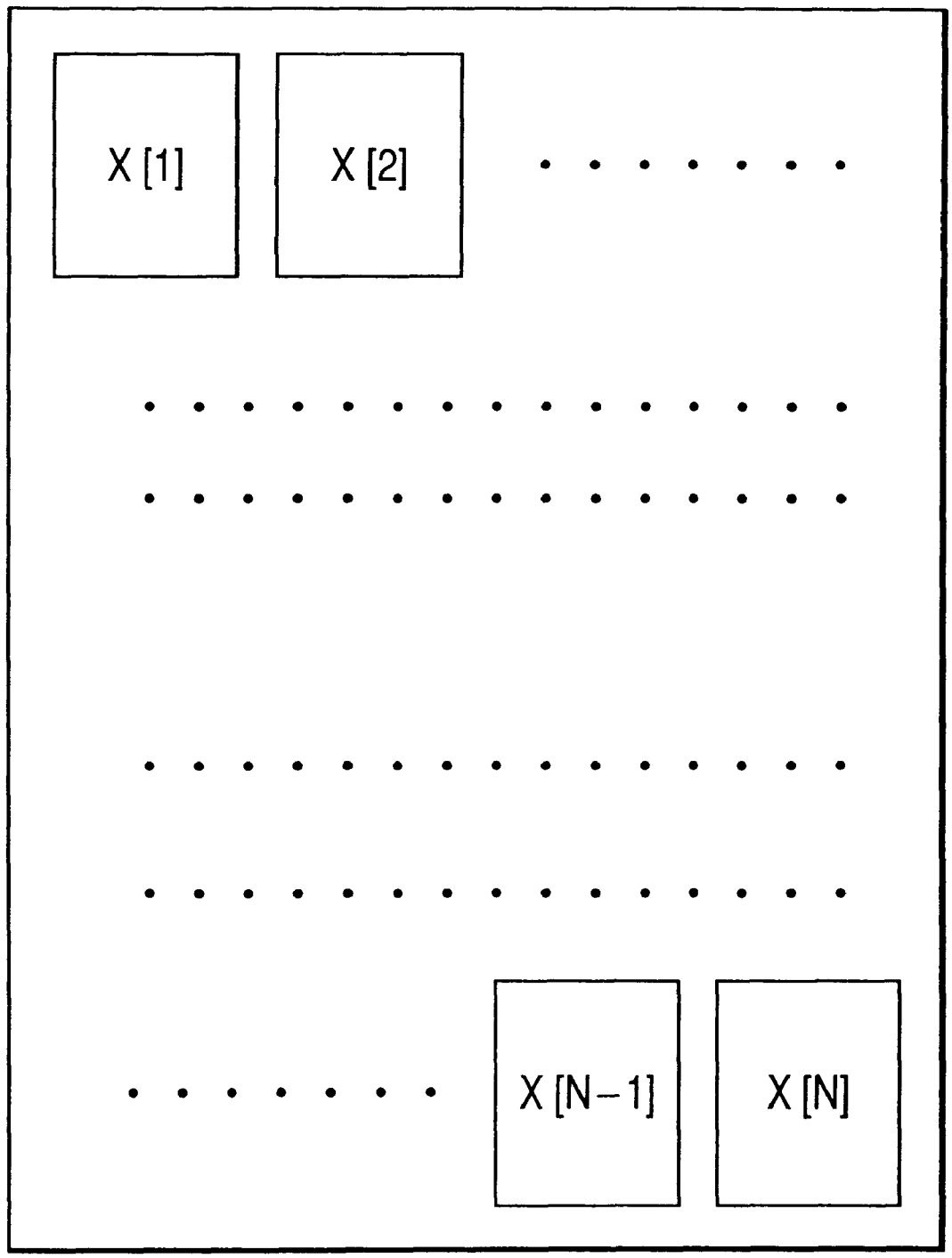
FIG. 7 is an explanatory diagram showing an arranging method of logical pages shown by an array X[ ] according to the first embodiment of the invention.

FIG. 7 shows a method of arranging the logical pages onto the physical page in the case where the despooler 305 performs the N-up printing by the array X[ ]. In the N-up printing, although a plurality of patterns are prepared in accordance with the normal arranging order, a case of arranging from the upper left to the right and from the top to the bottom is shown here for simplicity of explanation. As shown in the diagram, N logical pages of the array X[ ] are sequentially arranged from the upper left to the right and are arranged from the top to the bottom. The N-th logical page in the array is arranged at the lower right position.

To perform the N-up printing in accordance with the other arranging order, it can be realized by a method whereby when the logical page numbers are set in the array in steps S602 and S605, the positions of the logical page numbers to be set into the array X[ ] are changed in accordance with the pattern of the arranging order or a method whereby when the array X[ ] received by the despooler 305 is read out, the reading order is changed in accordance with the pattern of the arranging order.

On the basis of the logical page numbers arranged by the spool file manager 304, the despooler 305 reads out the drawing data included in the logical pages from the spool file 303 and outputs the GDI function to the graphic engine 202 while reducing the drawing data to the position on the physical page where they should be arranged. When the logical page number is equal to 0, it is interpreted that the position denotes the blank logical page and nothing is drawn in the relevant portion on the physical page. In this manner, all of the drawing processes of N logical pages included in the array X[ ] are executed. The forming process of one physical page in the despooler 305 is completed.

When the making of one physical page is finished in step S503 as mentioned above, in step S504, the spool file manager 304 subtracts "1" from P indicative of the number of remaining physical pages. Step S505 follows. In this manner, the processes in the case where the blank logical pages are included in the first logical page are finished and all of the remaining physical pages are printed while including N logical pages. In step S505, the spool file manager 304 executes the printing process of the physical page to be printed in the P-th order in the case where the pages have been printed in accordance with the normal order to the despooler 305. N logical pages are included in this physical page. FIG. 8 shows the details in step S505.

In FIG. 8, in step S801, in a manner similar to step S601, the spool file manager 304 obtains the value of C indicative of the number (showing which number of the page printed from the application) of the first logical page to be arranged in the physical page by the following calculation. N and P are the same as those in FIG. 5 mentioned above.

$$C=N(P-1)+1$$

"1" is also set into J indicating which number of the logical page to be arranged on the physical page.

In step S802, the spool file manager 304 sets the value of C to the J-th element in the array X[ ] in a manner similar to step S602. In step S803, the spool file manager 304 adds "1" to C and adds "1" to J in a manner similar to step S603. In step S804, when the value of J is larger than N, namely, when it is determined that all of the N logical page numbers of the array X[ ] have been set, step S805 follows. The spool file manager 304 instructs the despooler 305 to perform the N-up printing which is expressed by the array X[ ]. The process in step S505 comprising steps S801 to S805 is finished. A method of the N-up printing in step S805 is similar to that in step S608.

When the making of one physical page is finished in step S505 as mentioned above, in FIG. 5, "1" is again subtracted from P indicative of the number of remaining physical pages in step S506. In step S507, the number P of remaining physical pages is examined. When P is not larger than 0, it is regarded that the making of all of the physical pages has been finished. The processing routine is finished. When P is larger than 0, the processing routine is returned to step S505 and the next physical page is formed.

When the despooler 305 finishes the formation of all of the physical pages, the spool file manager 304 deletes the spool file. The despooler 305 is unloaded from the RAM 2 as necessary. Further, the spool file manager 304 itself is finished as necessary.

When the N-up reverse order printing is executed as mentioned above, the N-up reverse order printing can be executed by a combination of the logical pages and an arranging order which are similar to those in the N-up normal order printing in the printer 1500.

According to the first embodiment as mentioned above, the printer control system comprises: the spool file manager 304 for specifying the logical pages to be arranged on the physical page in case of performing the reduction arrangement printing and the reverse order printing and inserting the blank logical pages into the remaining portions in the case where the number of logical pages does not reach the upper limit in which the logical pages can be arranged on the physical page; the despooler 305 for reducing the drawing data of a plurality of logical pages including the blank logical pages and forming the drawing data of one page; and the printer driver 203 for controlling so as to arrange the plurality of logical pages including the blank logical pages onto the physical page and print. Therefore, even in the printer to perform the face-up paper delivery, the N-up output result can be obtained by a combination of pages similar to that in the normal order printing and by a page arranging order similar to that in the normal order printing.

2 Second Embodiment

In a manner similar to the above first embodiment, a printer control system according to the second embodiment is constructed by: the host computer 3000 comprising the CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and external memory 11; and the printer 1500 comprising the CPU 12, RAM 19, ROM 13, input section 18, engine interface (I/F) 16, disk controller (DKC) 20, printer engine 17, operation unit 1501, and external memory 14 (refer to FIG. 1).

Since a control construction (refer to FIG. 2) to perform a print data formation, a control construction (refer to FIG. 3) to perform a print data formation obtained by expanding FIG. 2, and an internal construction (refer to FIG. 11) of the printer 1500 in the host computer 3000 according to the second embodiment are also similar to those in the first embodiment, their descriptions are omitted.

According to the second embodiment, even in the N-up normal order printing, the spool file manager 304 designates the logical pages to be arranged onto each physical page by the foregoing array X[ ] to the despooler 305, thereby allowing the N-up printing operations of the normal order and reverse order to be executed without using the N-up printing function of the printer 1500.

Figure 9:
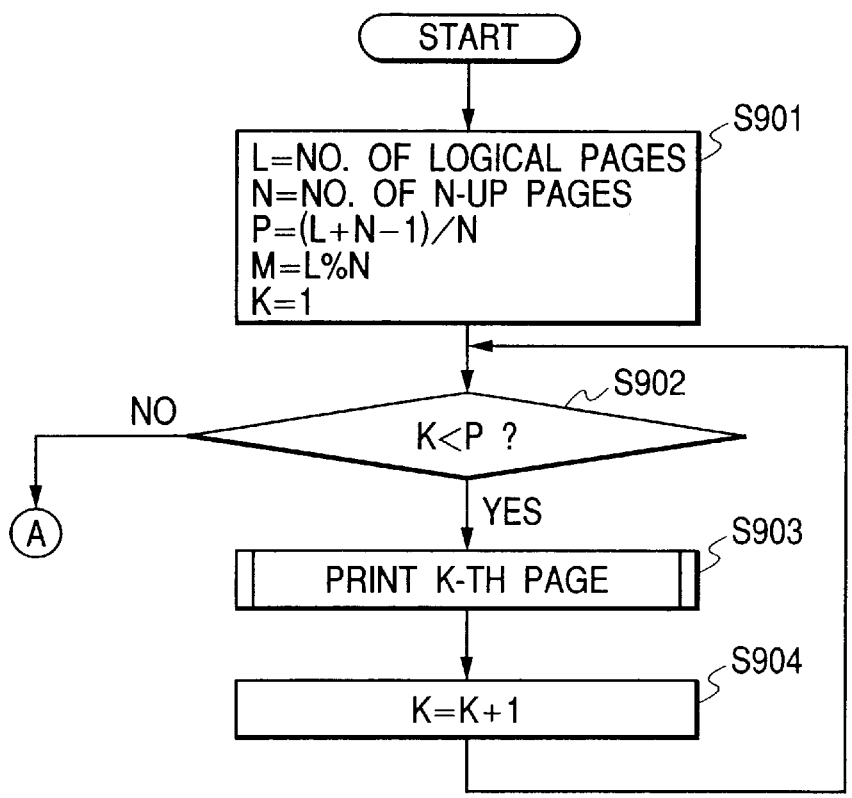
FIG. 9 is a flowchart showing a print processing procedure of an N-up normal order printing according to the second embodiment of the invention.
Figure 10:
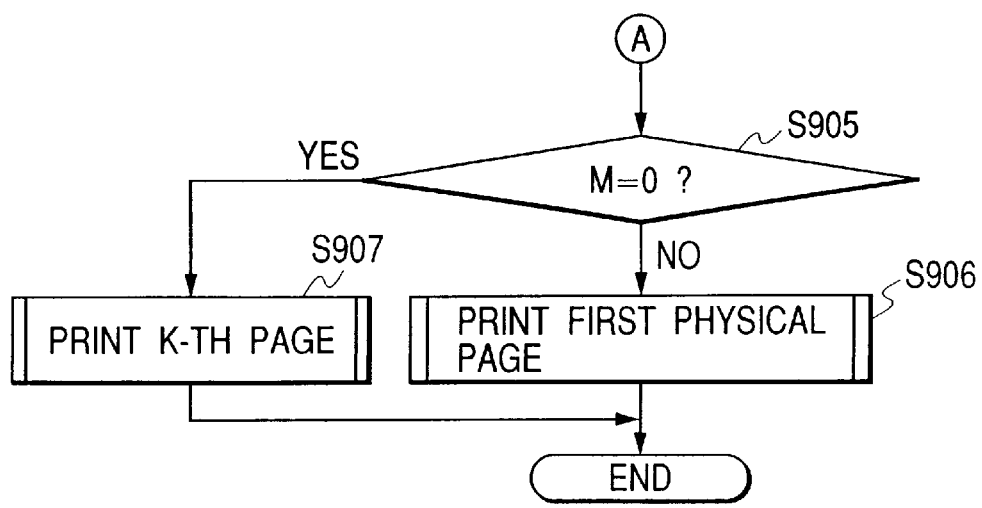
FIG. 10 is a flowchart showing a print processing procedure of the N-up normal order printing according to the second embodiment of the invention.

A print processing procedure of the N-up normal order printing in the printer control system according to the second embodiment with the above construction will now be described in detail mainly with reference to flowcharts of FIGS. 9 and 10. FIGS. 9 and 10 are control procedures showing the processes in the spool file manager 304 in case of performing the N-up normal order printing.

In FIGS. 9 and 10, in step S901, the spool file manager 304 sets the total number of logical pages in which the printing has been executed from the application to L and sets the number of logical pages to be arranged onto each physical page to N. On the basis of L and N obtained here, the number P of physical pages which are necessary to print is obtained by the following calculation.

$$P=(L+N-1)/N$$

The number M of logical pages included in the physical page to be finally printed is obtained by the following calculation.

$$M=L\%N$$

"1" is set into K indicative of the number of the physical page which is at present being processed.

In step S902, the spool file manager 304 discriminates whether K is smaller than P or not. When it is decided that K is smaller than P, in step S903, the printing process of the K-th physical page is performed. The process in step S903 is the same as a process in which P is replaced by K in the process shown in FIG. 8. In step S902, when it is determined that K is not smaller than P, it is decided that the K-th physical page is the final physical page. The processing routine advances to step S905.

In step S905, the spool file manager 304 discriminates whether M is equal to 0 or not. When M is determined to be 0, since the final physical page includes N logical pages, a process similar to step S903 is executed in step S907. When it is decided that M is not equal to 0, step S906 follows. The spool file manager 304 instructs the despooler 305 to print the physical page including the blank logical pages. The process in step S906 is the same as a process in which P is replaced by K in the process shown in FIG. 6.

When the N-up normal order printing is performed as mentioned above, a result in which the combination of the logical pages included in each physical page and the arranging order of the logical pages coincide with those of the printing result in the N-up reverse order printing described in the first embodiment is obtained.

According to the second embodiment as described above, the printer control system comprises: the spool file manager 304 for designating the logical pages to be arranged on each physical page on the basis of the array X[ ] to transfer the numbers of the N logical pages to be arranged on the physical page to the despooler 305 at the time of the N-up normal order printing; the despooler 305 for reducing the drawing data of a plurality of logical pages including the blank logical pages and forming the drawing data of one page; and the printer driver 203 for controlling so as to arrange the plurality of logical pages including the blank logical pages onto the physical page and print. Therefore, in a manner similar to the first embodiment, even in the printer for performing the face-up paper delivery, an N-up output result can be obtained by a combination of the page similar to that in the normal order printing and a page arranging order similar to that in the normal order printing.

3 Third Embodiment

In a manner similar to the first embodiment, a printer control system according to the third embodiment is constructed by: the host computer 3000 comprising the CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and external memory 11; and the printer 1500 comprising the CPU 12, RAM 19, ROM 13, input section 18, engine interface (I/F) 16, disk controller (DKC) 20, printer engine 17, operation unit 1501, and external memory 14 (refer to FIG. 1).

Since a control construction (refer to FIG. 2) to perform a print data formation, a control construction (refer to FIG. 3) to perform a print data formation obtained by expanding FIG. 2, and an internal construction (refer to FIG. 11) of the printer 1500 in the host computer 3000 according to the third embodiment are also similar to those in the first embodiment, their descriptions are omitted.

The third embodiment shows an example in the case where even in the N-up reverse order printing, the N-up printing is executed in accordance with the order opposite to the normal order, the combination of the logical pages and the arranging order which are similar to those in the normal order by using the N-up printing function of the printer.

In the first embodiment, in the process in step S608 in FIG. 6, the despooler 305 reduces the drawing data of N logical pages included in the physical page and prints them to the arranging positions, respectively. On the other hand, according to the third embodiment, in place of that, the printer 1500 is set so as to perform the N-up printing and the drawing data of N logical pages is sequentially printed in accordance with the arranging order without reducing. As for the blank logical page, a page having no drawing data (drawing data of only a form feed) is printed.

Even in the process in step S805 in FIG. 8, the despooler 305 sequentially prints the drawing data of N logical pages in accordance with the arranging order without reducing. Thus, the printer 1500 forms one physical page every data of N pages received and prints each physical page in the N-up printing mode.

When the N-up reverse order printing is executed as mentioned above, the N-up reverse order printing can be performed in accordance with a combination of logical pages and an arranging order which are similar to those in the N-up normal order printing by using the N-up printing function of the printer 1500.

According to the third embodiment as mentioned above, the printer control system comprises: the spool file manager 304 for specifying the logical pages to be arranged on the physical page in case of performing the reduction arrangement printing and the reverse order printing and inserting the blank logical pages into the remaining portions when the number of logical pages does not reach the upper limit in which they can be arranged on the physical page; the despooler 305 for instructing so as to sequentially print the drawing data of N logical pages in accordance with the arranging order without reducing; and the printer driver 203 for controlling so as to arranging the plurality of logical pages including the blank logical pages onto the physical page and print. Therefore, in a manner similar to the first embodiment, even in a printer for performing the face-up paper delivery, an N-up output result can be obtained by a combination of pages and a page arranging order which are similar to those in the normal order printing.

The invention can be applied to a system constructed by a plurality of equipment (for example, a host computer, interface equipment, a reader, a printer, and the like) or an apparatus (for instance, a copying apparatus, a printer, a facsimile apparatus, or the like) comprising one equipment. It will be obviously understood that the object of the invention is accomplished by a method whereby a storage medium in which program codes of software to realize the function of the foregoing embodiments have been stored is supplied to a system or an apparatus and a computer (or a CPU or an MPU) of the system or apparatus reads out and executes the program codes stored in the storage medium.

In this case, the program codes themselves read out from the storage medium realize the function of the foregoing embodiments. The storage medium in which the program codes have been stored constructs the invention.

As a storage medium to supply the program codes, for example, a floppy disk, a hard disk, an optical disk, a magnetooptic disk, a CD-ROM, a CD-R, a magnetic tape, a non-volatile memory card, an ROM, or the like can be used.

It will be obviously understood that the invention incorporates not only a case where by executing the program codes read out by the computer, the function of the foregoing embodiments is realized but also a case where an OS (operating system) or the like which operates on the computer executes a part or all of the actual processes on the basis of an instruction of the program codes and the function of the foregoing embodiments is realized by the process.

Further, it will be also obviously understood that the invention incorporates a case where the program codes read out from the storage medium are written into a memory equipped for a function expansion board inserted in a computer or a function expanding unit connected to the computer and, after that, a CPU or the like provided for the function expansion board or function expanding unit executes a part or all of the actual processes on the basis of an instruction of the program codes, and the function of the foregoing embodiments is realized by the process.

According to the invention as described above, there is provided the print control apparatus having the reduction arrangement printing function for reducing and arranging a plurality of pages into one page and printing, comprising: the specifying means for specifying logical pages to be arranged on a physical page in case of performing the reduction arrangement printing and the reverse order printing; the inserting means for inserting blank logical pages into the remaining portions in the case where the number of logical pages does not reach the upper limit in which they can be arranged on the physical page; and print control means for controlling so as to arrange the plurality of logical pages including the blank logical pages onto the physical page and print. Therefore, even in the printing apparatus for performing the face-up paper delivery, an output result by the reduction arrangement printing (N-up printing) can be obtained in accordance with a combination of pages and a page arranging order which are similar to those in the normal order printing.

According to the invention, the print control apparatus has the forming means for forming the drawing data of one page by reducing the drawing data of a plurality of logical pages including the blank logical pages, and the print control means controls so as to arrange the drawing data of one page onto one physical page and print. Therefore, in a manner similar to the invention of claim 1, even in the printing apparatus for performing the face-up paper delivery, an output result by the reduction arrangement printing (N-up printing) can be obtained in accordance with a combination of pages and a page arranging order which are similar to those in the normal order printing.

According to the invention, the logical page in the print control apparatus is the ordinary page which is handled by the application and the physical page is the page which is actually printed and outputted and includes a plurality of reduced pages. Therefore, by controlling so as to arrange a plurality of logical pages including the blank logical pages onto the physical page and print as mentioned above, an output result by the reduction arrangement printing (N-up printing) can be obtained in accordance with a combination of pages and a page arranging order which are similar to those in the normal order printing.

According to the invention, the reverse order printing of the print control apparatus denotes that the logical pages are sequentially arranged on the physical page in accordance with the order from the small page number and the physical pages are sequentially arranged and printed in accordance with the reverse order from the final page. Therefore, in case of performing the reduction arrangement printing (N-up printing) and the reverse order printing, an output result by the reduction arrangement printing (N-up printing) can be obtained in accordance with a combination of pages and a page arranging order which are similar to those in the normal order printing.

According to the invention, the print control apparatus can be applied to the system for transmitting the print data from the upper apparatus such as a computer or the like to the printing apparatus such as a printer or the like and printing. Therefore, even in a system for transmitting the print data from the upper apparatus to the printing apparatus and printing, an output result by the reduction arrangement printing (N-up printing) can be obtained in accordance with a combination of pages and a page arranging order which are similar to those in the normal order printing.

According to the invention, the print control apparatus comprises: the preserving means for temporarily preserving the data in an intermediate code format different from that of the print data; and the forming means for forming the print data on the basis of the temporarily preserved data. Therefore, even in a system for forming print data and transmitting to the printing apparatus after the upper apparatus temporarily preserved the data in the intermediate code format, an output result by the reduction arrangement printing (N-up printing) can be obtained in accordance with a combination of pages and a page arranging order which are similar to those in the normal order printing.

According to the invention, there is provided the print control apparatus for outputting print data including at least one physical page in which a plurality of logical pages are reduced and arranged, comprising: the dispatcher means for receiving the common print information which is formed on the basis of the drawing data formed by an arbitrary application from the drawing means depending on the OS; the intermediate data converting means for converting the print information received by the dispatcher means into the intermediate data and storing the intermediate data into the spool means; the designating means for designating the reverse order printing and the reduction arrangement of the logical pages; the specifying means for specifying the logical pages to be arranged on the physical page in the case where the reverse order printing and the reduction arrangement are designated by the designating means; inserting means for inserting the blank logical pages into the remaining portions in the case where the number of logical pages does not reach the upper limit in which they can be arranged on the physical page; modifying means for forming intermediate data in which a plurality of logical pages including the blank logical pages are arranged onto the physical page from the intermediate data stored in the spool means and outputting the intermediate data to the drawing means in the drawing data format; and print data forming means for converting the print information received by the dispatcher means into the print data constructed by the control command and outputting the print data to an external apparatus. Therefore, even if the print driver in the printing apparatus for performing the face-up paper delivery is not modified, an output result by the reduction arrangement printing (N-up printing) can be obtained in accordance with a combination of pages and a page arranging order which are similar to those in the normal order printing.

According to the invention, since the drawing data is the GDI (Graphical Device Interface), the invention can be also applied to a system using the application to output the GDI function.

According to the invention, since the print information is the DDI (Device Driver Interface), the invention can be also applied to a system using a graphic engine such as to output the DDI function.

According to the invention, since the print data is the page description language, the invention can be applied to a system to form the print data as a page description language.

What is claimed is:

1. An information processing apparatus having a reduction arrangement printing function for reducing and arranging a plurality of pages into one page and generating print data, comprising:

specifying means for, in performing a reduction arrangement printing and a reverse order printing, specifying a number of logical pages, M, to be arranged on a first physical page in the reverse order printing based on a total number of arranged pages, L, and a number of logical pages, N, to be arranged on each physical page;

arranging means for arranging the M logical pages to be arranged on the first physical page and blank (N-M) logical pages on the first physical page in the reverse order printing if the number M does not reach an upper limit in which the logical pages can be arranged on the physical page; and print data generating means for generating print data of the physical page on which a plurality of logical pages including the (N-M) blank logical pages are arranged in the reverse order printing.

2. An apparatus according to claim 1, further comprising forming means for forming drawing data of one page by reducing drawing data of said plurality of logical pages including said blank logical pages, and wherein said print data generating means generates so as to arrange said drawing data of one page onto one physical page and print.

3. An apparatus according to claim 1, wherein said logical page is an ordinary page which is handled by an application and said physical page is a page which is actually printed and outputted and includes a plurality of reduced pages.

4. An apparatus according to claim 1, wherein said reverse order printing denotes that the logical pages are sequentially arranged onto the physical page in accordance with the order from a small page number and said physical pages are sequentially arranged and printed reversely from a final page.

5. An apparatus according to claim 1, wherein said apparatus is applied to a system for transmitting print data from an upper apparatus to a printing apparatus and printing.

6. An apparatus according to claim 5, further comprising:

preserving means for temporarily preserving data in an intermediate code format different from that of the print data; and forming means for forming print data on the basis of said data which was temporarily preserved.

7. An information processing method having and reduction arrangement printing function for reducing and arranging a plurality of pages into one page and generating print data, comprising:

a specifying step, of, in performing a reduction arrangement printing and a reverse order printing, specifying a number of logical pages, M, to be arranged on a first physical page in the reverse order printing based on a total number of logical pages, L, and a number of logical pages, N, to be arranged on each physical page;

an arranging step, of arranging the M logical pages to be arranged on the first physical page and inserting (N-M) blank logical pages on the first physical page in the reverse order printing if the number M does not reach an upper limit in which the logical pages can be arranged on the physical page; and a print data generating step, of generating print data of the physical page on which a plurality of logical pages including the (N-M) blank logical pages are arranged in the reverse order printing.

8. A method according to claim 7, further comprising a forming step, of forming drawing data of one page by reducing drawing data of said plurality of logical pages including said blank logical pages, and wherein in said print data generating step, a control is made to as to arrange said drawing data of one page onto one physical page and print.

9. A method according to claim 7, wherein said logical page is an ordinary page which is handled by an application and said physical page is a page which is actually printed and includes a plurality of reduced pages.

10. A method according to claim 7, wherein said reverse order printing denotes that the logical pages are sequentially arranged onto the physical page in accordance with the order from a small page number and said physical pages are sequentially arranged and printed reversely from a final page.

11. A method according to claim 7, wherein said method is applied to a system for transmitting print data from an upper apparatus to a printing apparatus and printing.

12. A method according to claim 11, further comprising:

a preserving step of temporarily preserving data in an intermediate code format different from that of the print data; and a forming step of forming print data on the basis of said data which was temporarily preserved.

13. A storage medium in which a program for an information processing method having a reduction arrangement printing function for reducing and arranging a plurality of pages into one page and generating print data has been stored, wherein said program comprises:

a specifying step, of, in performing a reduction arrangement printing and a reverse order printing, specifying a number of logical pages, M, which are arranged on a first physical page in the reverse order printing based on a total number of logical pages, L, and a number of logical pages, N, to be arranged on each physical page;

an arranging step, of arranging the M logical pages to be arranged on the first physical page and inserting (N-M) blank logical pages on the first physical page in the reverse order printing if the number M does not reach an upper limit in which the logical pages can be arranged on the physical page; and a print data generating step, of generating print data of the physical page on which a plurality of logical pages including the (N-M) blank logical pages are arranged in the reverse order printing.

14. A medium according to claim 13, wherein said program further comprises a forming step, of forming drawing data of one page by reducing drawing data of said plurality of logical pages including said blank logical pages, and in said print data generating step, a control is made so as to arrange said drawing data of one page onto one physical page and print.

15. A medium according to claim 13, wherein said logical page is an ordinary page which is handled by an application and said physical page is a page which is actually printed and includes a plurality of reduced pages.

16. A medium according to claim 13, wherein said reverse order printing denotes that the logical pages are sequentially arranged onto the physical page in accordance with the order from a small page number and said physical pages are sequentially arranged and printed reversely from a final page.

17. A medium according to claim 13, wherein said medium can be applied to a system for transmitting print data from an upper apparatus such as a computer or the like to a printing apparatus such as a printer or the like and printing.

18. A medium according to claim 17, wherein said program further comprises:

a preserving step of temporarily preserving data in an intermediate code format different from that of the print data; and a forming step of forming print data on the basis of said data which was temporarily preserved.

19. An information processing apparatus for generating print data including at least one physical page in which a plurality of logical pages are reduced and arranged, comprising:

dispatcher means for receiving common print information formed on a basis of drawing data formed by an arbitrary application from drawing means depending on an OS;

intermediate data converting means for converting the print information received by said dispatcher means into intermediate data and storing the intermediate data into spool means;

designating means for designating a reverse order printing and reduction arrangement of the logical pages;

specifying means for specifying a number of logical pages to be arranged on a physical page if the reverse order printing and the reduction arrangement are designated by said designating means;

arranging means for arranging the logical pages to be arranged on the physical page and one or more blank logical pages in the reverse order printing if the number of logical pages does not reach an upper limit in which the logical pages are arrangeable on the physical page;

modifying means for forming intermediate data in which a plurality of logical pages including the one or more blank logical pages are arranged in a reverse order on the physical page from the intermediate data stored in the spool means and outputting the intermediate data to said drawing means in the drawing data format; and print data generating means for generating print data to be outputted to an external apparatus by converting the print information received by said dispatcher means into print data constructed by a control command.

20. An apparatus according to claim 19, wherein said drawing data is a GDI (Graphical Device Interface).

21. An apparatus according to claim 19, wherein said print information is a DDI (Device Driver Interface).

22. An apparatus according to claim 19, wherein said print data is a page description language.

23. An information processing method of generating print data including at least one physical page in which a plurality of logical pages are reduced and arranged, comprising:

a receiving step of receiving common print information formed on a basis of drawing data formed by an arbitrary application from drawing means depending on an OS;

an intermediate data converting step of converting the received print information into intermediate data and storing the intermediate data into spool means;

a designating step of designating a reverse order printing and reduction arrangement of the logical pages;

a specifying step of specifying a number of logical pages to be arranged on a physical page if the reverse order printing and the reduction arrangement are designated by said designating step;

an arranging step of arranging the logical pages to be arranged on the physical page and one or more blank logical pages in the reverse order printing if the number of logical pages does not reach an upper limit in which the logical pages are arrangeable on the physical page;

a modifying step of forming intermediate data in which a plurality of logical pages including the one or more blank logical pages are arranged in a reverse order on the physical page from the intermediate data stored in the spool means and outputting the intermediate data to said drawing means in the drawing data format; and a print data generating step of generating print data to be outputted to an external apparatus by converting the print information received by said receiving step into print data constructed by a control command.

24. A method according to claim 23, wherein said drawing data is a GDI (Graphical Device Interface).

25. A method according to claim 23, wherein said print information is a DDI (Device Driver Interface).

26. A method according to claim 23, wherein said print data is a page description language.

27. A storage medium in which an information processing program for generating print data including at least one physical page in which a plurality of logical pages are reduced and arranged has been stored, wherein said program comprises:

a receiving step of receiving common print information formed on a basis of drawing data formed by an arbitrary application from drawing means depending on an OS;

an intermediate data converting step of converting the received print information into intermediate data and storing the intermediate data into spool means;

a designating step of designating a reverse order printing and reduction arrangement of the logical pages;

a specifying step of specifying logical pages to be arranged on a physical page if the reverse order printing and the reduction arrangement are designated by said designated step;

an arranging step of arranging the logical pages to be arranged on the physical page and one or more blank logical pages in the reverse order printing if the number of logical pages does not reach an upper limit in which the logical pages are arrangeable on the physical page;

a modifying step of forming intermediate data in which a plurality of logical pages including the one or more blank logical pages are arranged in a reverse order on the physical page from the intermediate data stored in said spool means and outputting the-intermediate data to said drawing means in the drawing data format; and a print data generating step of generating print data to be outputted to an external apparatus by converting the print information received by said receiving step into print data constructed by a control command.

28. A medium according to claim 27, wherein said drawing data is a GDI (Graphical Device Interface).

29. A medium according to claim 27, wherein said print information is a DDI (Device Driver Interface).

30. A medium according to claim 27, wherein said print data is a page description language.

31. An information processing apparatus having a reduction arrangement printing function for reducing and arranging a plurality of pages into one page and generating print data, comprising:

a specifying device adapted, in performing a reduction arrangement printing and a reverse order printing, to specify a number of logical pages, M, to be arranged on a first physical page in the reverse order printing based on a total number of logical pages, L, and a number of logical pages, N, to be arranged on each physical page;

an arranging device adapted to arrange the logical pages M to be arranged on the first physical page and (N-M) blank logical pages on the first physical page in the reverse order printing if the number M does not reach an upper limit in which the logical pages can be arranged on the physical page; and a print data generating device adapted to generate print data of the physical page on which a plurality of logical pages including the (N-M) blank logical pages are arranged in the reverse order printing.

32. An apparatus according to claim 31, further comprising a forming device adapted to form drawing data of one page by reducing drawing data of said plurality of logical pages including said blank logical pages, and wherein said print data generating device generates so as to arrange said drawing data of one page onto one physical page and print.

33. An apparatus according to claim 31, wherein said logical page is an ordinary page which is handled by an application and said physical page is a page which is actually printed and outputted and includes a plurality of reduced pages.

34. An apparatus according to claim 31, wherein said reverse order printing denotes that the logical pages are sequentially arranged onto the physical page in accordance with the order from a small page number and said physical pages are sequentially arranged and printed reversely from a final page.

35. An apparatus according to claim 31, wherein said apparatus is applied to a system for transmitting print data from an upper apparatus to a printing apparatus and printing.

36. An apparatus according to claim 35, further comprising:

a preserving device adapted to temporarily preserve data in an intermediate code format different from that of the print data; and a forming device adapted to form print data on a basis of the data which was temporarily preserved.

37. An information processing apparatus for generating print data including at least one physical page in which a plurality of logical pages are reduced and arranged, comprising:

a dispatcher device adapted to receive common print information formed on a basis of drawing data formed by an arbitrary application from a drawing device depending on an OS;

an intermediate data converting device adapted to convert the print information received by said dispatcher device into intermediate data and storing the intermediate data into a spool device;

a designating device adapted to designate a reverse order printing and reduction arrangement of the logical pages;

a specifying device adapted to specify a number of logical pages to be arranged on a physical page if the reverse order printing and the reduction arrangement are designated by said designating device;

an arranging device adapted to arrange the logical pages to be arranged on the physical page and one or more blank logical pages in the reverse order printing if the number of logical pages does not reach an upper limit in which the logical pages are arrangeable on the physical page;

a modifying device adapted to form intermediate data in which a plurality of logical pages including the one or more blank logical pages are arranged in a reverse order on the physical page from the intermediate data stored in the spool device and outputting the intermediate data to said drawing device in the drawing data format; and a print data generating device adapted to generate print data to be outputted to an external apparatus by converting the print information received by said dispatcher device into print data constructed by a control command.

38. An apparatus according to claim 37, wherein the drawing data is a GDI (Graphical Device Interface).

39. An apparatus according to claim 37, wherein the print information is a DDI (Device Driver Interface).

40. An apparatus according to claim 37, wherein the print data is described in a page description language.

* * * * *

UNITED STATES PATENT AND TRADEMARK OFFICE
CERTIFICATE OF CORRECTION

PATENT NO.   : 6,501,562 B1
DATED        : December 31, 2002
INVENTOR(S)  : Koji Nakagiri et al.

It is certified that error appears in the above-identified patent and that said Letters Patent is hereby corrected as shown below:

<u>Title page,</u>
Item [56], FOREIGN PATENT DOCUMENTS, "EP 04870   4/1992" should read
-- EP 0478970   4/1992 --.

<u>Column 5,</u>
Line 9, "ROM 3cfor" should read -- ROM 3c for --; and
Line 25, "images, 11" should read -- images, characters, tables, and the like. The external memory 11 --.

<u>Column 8,</u>
Line 62, "a n" should read -- an --.

<u>Column 11,</u>
Line 39, "X[ ])," should read -- X[ ], --.

<u>Column 18,</u>
Line 47, "and" should read -- a --.

<u>Column 21,</u>
Line 49, "the-intermediate" should read -- the intermediate --.

Signed and Sealed this

Fourth Day of November, 2003

JAMES E. ROGAN
*Director of the United States Patent and Trademark Office*